US009404270B2

(12) United States Patent
Condon

(10) Patent No.: US 9,404,270 B2
(45) Date of Patent: Aug. 2, 2016

(54) PANEL AND MOUNTING SYSTEM

(71) Applicant: WEST TAMPA GLASS COMPANY, Tampa, FL (US)

(72) Inventor: Patrick Condon, Oldsmar, FL (US)

(73) Assignee: West Tampa Glass Company, Tampa, FL (US)

( * ) Notice: Subject to any disclaimer, the term of this patent is extended or adjusted under 35 U.S.C. 154(b) by 0 days.

(21) Appl. No.: 14/852,992

(22) Filed: Sep. 14, 2015

(65) Prior Publication Data

US 2016/0138273 A1    May 19, 2016

Related U.S. Application Data

(60) Provisional application No. 62/080,587, filed on Nov. 17, 2014.

(51) Int. Cl.
| E04F 13/08 | (2006.01) |
| E04F 13/12 | (2006.01) |
| B32B 15/085 | (2006.01) |
| B32B 7/12 | (2006.01) |
| B32B 15/20 | (2006.01) |

(52) U.S. Cl.
CPC .............. *E04F 13/0803* (2013.01); *B32B 7/12* (2013.01); *B32B 15/085* (2013.01); *B32B 15/20* (2013.01); *E04F 13/0866* (2013.01); *E04F 13/12* (2013.01); *B32B 2307/3065* (2013.01); *B32B 2607/00* (2013.01)

(58) Field of Classification Search
CPC .............. E04B 5/10; E04B 9/30; E04B 1/70; E04B 1/7069; E04B 2/88; E04B 2/96; E04B 2/885; E04B 1/7038; E04B 2/7069; E04F 13/0875; E04F 13/0846; E04F 13/0898; E04F 13/0803; E04F 13/0866; E04F 13/12; E04F 13/072; E04F 13/0816; E04F 13/0805; E04F 13/083; B32B 7/12; B32B 15/085; B32B 15/20; B32B 2307/3065; B32B 2607/00; E06B 9/01
USPC .................. 52/235, 202–203, 483.1, 309.14, 52/506.06
See application file for complete search history.

(56) References Cited

U.S. PATENT DOCUMENTS

| 4,866,896 | A * | 9/1989 | Shreiner | E04F 13/081 52/235 |
| 6,035,598 | A * | 3/2000 | Sukolics | E04F 13/081 52/235 |
| 6,202,377 | B1 * | 3/2001 | Krieger | E04F 13/0812 52/489.1 |
| 7,562,509 | B2 * | 7/2009 | Ness | E04F 13/0889 52/235 |
| 7,937,902 | B1 * | 5/2011 | Smith | E04F 13/0889 52/235 |
| 2008/0134594 | A1 * | 6/2008 | Ness | E04F 13/0889 52/200 |
| 2009/0241451 | A1 * | 10/2009 | Griffiths | E04F 13/081 52/309.4 |
| 2009/0313932 | A1 * | 12/2009 | Montgomery | E04F 13/081 52/408 |
| 2010/0229484 | A1 * | 9/2010 | Carolan | E04C 2/292 52/302.1 |
| 2013/0205698 | A1 * | 8/2013 | Todd | E04F 13/0805 52/302.1 |

* cited by examiner

*Primary Examiner* — Beth Stephan
(74) *Attorney, Agent, or Firm* — Larson & Larson, P.A.; Frank Liebenow; Patrick Reid

(57) ABSTRACT

A composite panel system for attaching to a wall system includes a layer of continuous insulation covering the wall system and a plurality of vertical girts affixed the wall system such that the continuous insulation lays between the wall system and the vertical girts. Composite panels are mounted to a perimeter frame of extrusions, generally two horizontal and two vertical. The panel frame horizontal extrusions are mounted to the vertical girts by fasteners. In some embodiments, gypsum and a membrane are used in lieu of continuous insulation.

11 Claims, 3 Drawing Sheets

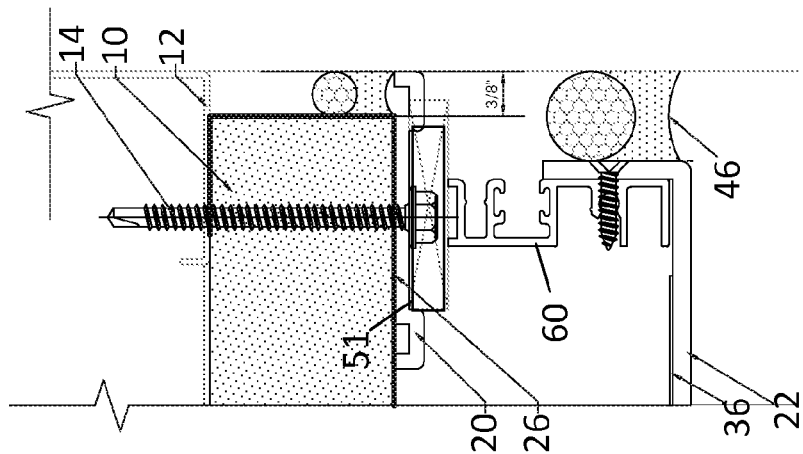
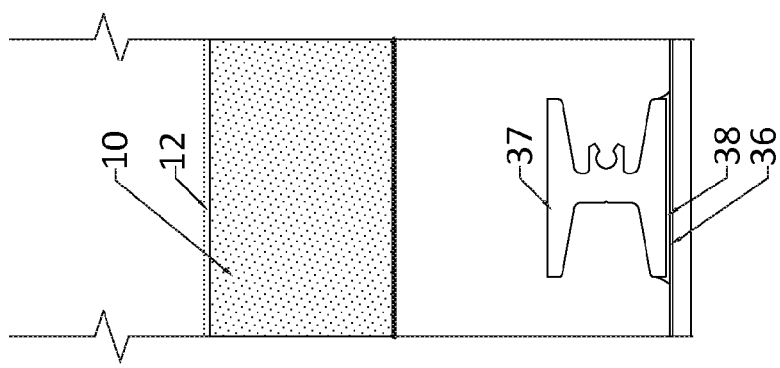
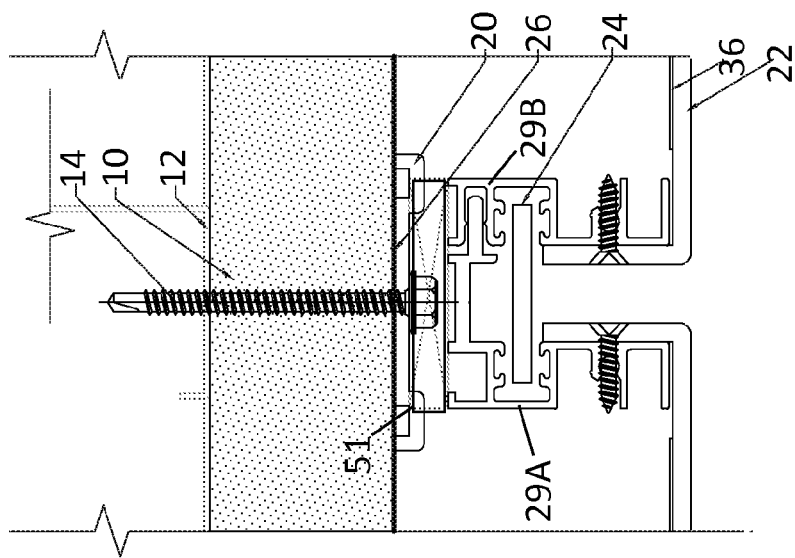

PANEL AND MOUNTING SYSTEM

CROSS-REFERENCE TO RELATED APPLICATION

This application claims the benefit of U.S. provisional application No. 62/080,587 filed on Nov. 17, 2014, the disclosure of which is incorporated by reference.

FIELD

This invention relates to the field of building materials and more particularly to a panel system for installation over studs or cement walls of a building.

BACKGROUND

Weather extremes and therefore building codes vary from state to state and locality to locality. Prior construction components and designs provide sheathing over continuous insulation, thereby reducing wind and moisture penetration, but do not provide tested, narrow, attachment systems for composite metal panels with decorative colors and textures.

One prior attempt required steel girt systems dimensioned up to 1½ inches over the face of the continuous insulation, creating architectural challenges due to a large increase in wall dimension and the steel-space between the panels and the continuous insulation. This prior attempt required foam insulation to be applied to the inside of the steel studs which is costly and often impractical. Other prior attempts promoted a system without deflection stiffeners or impact resistant features or water testing for windows; which can lead to installation problems.

What is needed is a panel and attachment system that will adapt to building codes that vary from localities with low chances of extreme wind storms to localities that have high chances of such, along with variations from extreme cold to extreme heat.

SUMMARY

In one embodiment, a composite panel system for attaching to a wall system is disclosed. The composite panel system includes a layer of continuous insulation covering the wall system and a plurality of vertical girts affixed to the wall system such that the continuous insulation lies between the wall system and the vertical girts. The composite panels are assembled on a perimeter frame of extrusions, generally two perimeter-horizontal, two perimeter-vertical. The horizontal members of this frame are mounted to the vertical girts by fasteners. Several composite panels are held in place, each composite panel with two horizontal extrusions held to adjacent vertical girt members by fasteners.

BRIEF DESCRIPTION OF THE DRAWINGS

The invention can be best understood by those having ordinary skill in the art by reference to the following detailed description when considered in conjunction with the accompanying drawings in which:

FIG. 3 illustrates a plan view of the mating of two vertical members and two metal composite panels.

FIG. 4 illustrates a plan view of a stiffener member of the metal composite panel system.

FIG. 5 illustrates a plan view of a vertical jamb of the metal composite panel system at the edge of the panel system opening.

DETAILED DESCRIPTION

Figure 1:
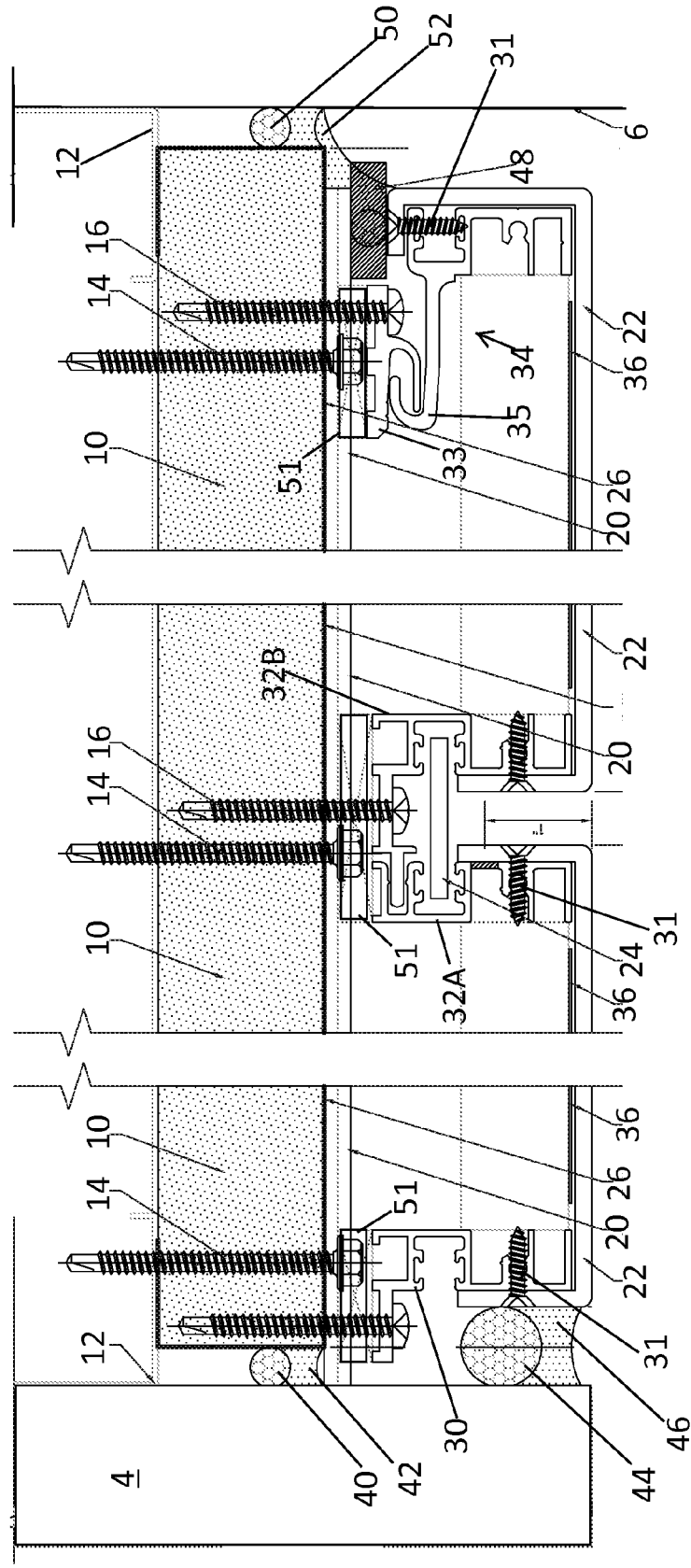
FIG. 1 illustrates a cross-sectional view of an installation of metal composite panels on metal studs.

Reference will now be made in detail to the presently preferred embodiments of the invention, examples of which are illustrated in the accompanying drawings. Throughout the following detailed description, the same reference numerals refer to the same elements in all figures.

Note that, throughout this description, exemplary composite panels 22 are described, though the disclosed system is equally anticipated for many other types and compositions of panels and this application is not limited to any particular type, style, or shape of panels 22. The composite panels 22 may have metal skins and a planar core. The skins may be aluminum, fire retardant and 0.020 inches thick, and the core may be polyethylene. Further, exemplary extrusions 29A/29B/30/32A/32B/34 are shown of specific shape as tested by the inventor, but the disclosed shape is one of many anticipated cross-sectional shapes and any cross-sectional shape is anticipated and included here within.

Note that, throughout this description, the drawings illustrate an optional rain-screen insert 24 between composite panels 22. It is fully anticipated that, when the optional rain-screen insert 24 is absent, a silicone seal (or other seal) is placed between the panels 22 instead.

The disclosed system enables installation of panels 22 such that the exterior surface of the metal panels 22 is mounted in as little as 2½ inches from the face of the continuous insulation 10 with improved installation time and tested to meet building code requirements for high wind areas.

Referring to FIG. 1, a cross sectional view of an installation of metal composite panels 22 on metal studs 12 is shown. In this exemplary installation, horizontal members 30/32A/32B/33/34 are installed, holding panels 22 (e.g., composite panels). Any installation having any number of horizontal members 30/32A/32B/33/34 and any number of panels 22 is anticipated. Note that although composite panels 22 are used as examples of such panels 22 throughout the description, other panels 22 are equally anticipated such as those with the brand name of Trespa® (Registered TM of Trespa) panels.

The panel system preferably installs over a layer of continuous insulation 10. Continuous insulation, as known in the industry, is insulation that is continuous across all structural members without thermal bridges (other than fasteners) and service openings. Although it is preferred to install the panel system over continuous insulation 10, it is equally anticipated that the disclosed panel system be installed over other continuous insulation products having an air-water barrier, for example, RMAX® (Registered TM of Rmax Operating LLC) or mineral wool. It is equally anticipated that the disclosed panel system can be installed over gypsum with a weather resistant membrane over the gypsum, in lieu of the continuous insulation.

An example of such continuous insulation 10 Thermax® (Registered Trademark of the Dow Chemical Company, see ESR 1659 for an evaluation report of Thermax®). A plurality of vertical girts 20 are mounted vertically over the continuous insulation 10 and in some embodiments is secured to the wall structure (e.g. steel studs 12 in this example or cement walls) by fasteners 14 that pass through the vertical girts 20, through the continuous insulation 10 and tap into the wall structure (e.g., steel studs 12, or cement walls). Vertical girts 20 provide lateral support to the wall panel, primarily, to resist wind loads. When the wall structure includes steel studs 12, it is preferred that the steel studs 12 be at a minimum 18 gauge steel studs, installed 16 inches on center. Although any suitable material is anticipated, in this example, the vertical girts 20 are made of aluminum having a depth of approximately 0.25 inches or more, normally continuous, but not required to be so.

The thickness of the continuous insulation 10 is determined to meet energy requirements for steel framed walls in the targeted climate zones, preferably between 1.5 and 3 inches thick. Optionally, tape and/or silicone are applied to the insulation 10 to create a further barrier to wind, air, vapor, and fire. For example, the installation shown includes a layer of waterproof tape 26 covering the continuous insulation 10 beneath the vertical girt 20 and around the edge of the continuous insulation 10.

Although the order of installation is not limited in any way, in one example, once the continuous insulation 10 and vertical girt 20 is installed, a series of horizontal members 30/32B/33 are affixed to the vertical girts 20 by fasteners 16. The fasteners 16 screw into the vertical girts 20.

Shown are horizontal members 30/32A/32B/33/34. The lower horizontal member 33/34 is mounted to the vertical girt 20 next to the starting point, for example, floor system 6; which is preferably, though not required, sealed by a floor gasket 50 and/or sealant 52, thereby reducing wind, vapor, and/or moisture penetration. The lower horizontal member 33/34 has two parts. The first part of the lower horizontal members 33/34 is a receiver 33. The second part 34 of the lower horizontal member 33/34 is mounted to the composite panel 22 and has a hook end 35 that interfaces with the receiver 33. In this way, the receiver 33 is affixed to the vertical girt 20 by the fastener 16, then the lower section of composite panel 22 is affixed to the body 34 by a fastener 31, and then, the assembly including the composite panel 22 is hooked together by this lower horizontal member 33/34.

The intermediate horizontal members 32A/32B connect two composite panels 22, each affixed to the intermediate horizontal members 32A/32B by fasteners 31. One section 32B of the intermediate horizontal members 32A/32B is affixed to the vertical girt 20 by fasteners 16. In some installations, a rain-screen insert 24 is installed within the intermediate horizontal members 32A/32B after the fasteners 16 are installed. The rain-screen insert 24 provides some resistance to wind, vapor, and/or moisture penetration plus, in some installations, has aesthetic attributes. It is anticipated that the rain-screen insert 24 be made of the same or similar materials as is the composite panels 22 and that the rain-screen insert 24 be colored as desired, either the same or different colors than the composite panels 22.

The upper horizontal member 30 connects the top of the last composite panel 22 to the vertical girt 20. The upper horizontal member 30 is affixed to the vertical girt 20 by fasteners 16. The edge of the last composite panel 22 is affixed to the upper horizontal member 30 by fasteners 31. In some installations, a gasket 40 and/or sealant 42 provide additional resistance to wind, vapor, and/or moisture penetration between the insulation 10 and the overhang structure 4. Additionally, to reduce wind, vapor, and/or moisture penetration in behind the composite panels 22, an upper horizontal member gasket 44 and/or sealant 46 is optionally applied between the upper horizontal member 30 and the overhang structure 4.

The composite panel 22 is made of any suitable material, preferably fire resistant composite aluminum, and is for example colored or finished to suit the desired appearance and corrosion resistance.

In some embodiments, the composite panel 22 further includes an impact plate 36. The impact plate 36 is typically installed in the factory, allowing for final assembly of composite panels 22 that meet various impact standards. For example, by adding a first thickness of impact plate 36, the composite panel 22 is specified for building codes that require passing of a test that includes a nine pound, 2"×4" missile D traveling at 34 MPH. If the building codes require passing a more stringent test, such as a test that includes a nine pound, 2"×4" missile E traveling at 55 MPH, a heavier gauge impact plate 36 is installed. It is anticipated that the impact plate 36 be affixed to the back surface of the composite panel 22 using an adhesive, preferably a silicone adhesive such as Dow 983 from the Dow Corning Company. Although any suitable material is anticipated, it is preferred that the impact plate 36 be made of steel.

In one embodiment, the composite panel 22 is made of 4 mil aluminum (fire resistant) and the entire assembly meets fire code requirements, possibly including NFPA285.

Optional shims 51 provide for wall adjustment (i.e. to achieve plumb steel stud or concrete wall), as needed.

Figure 2:
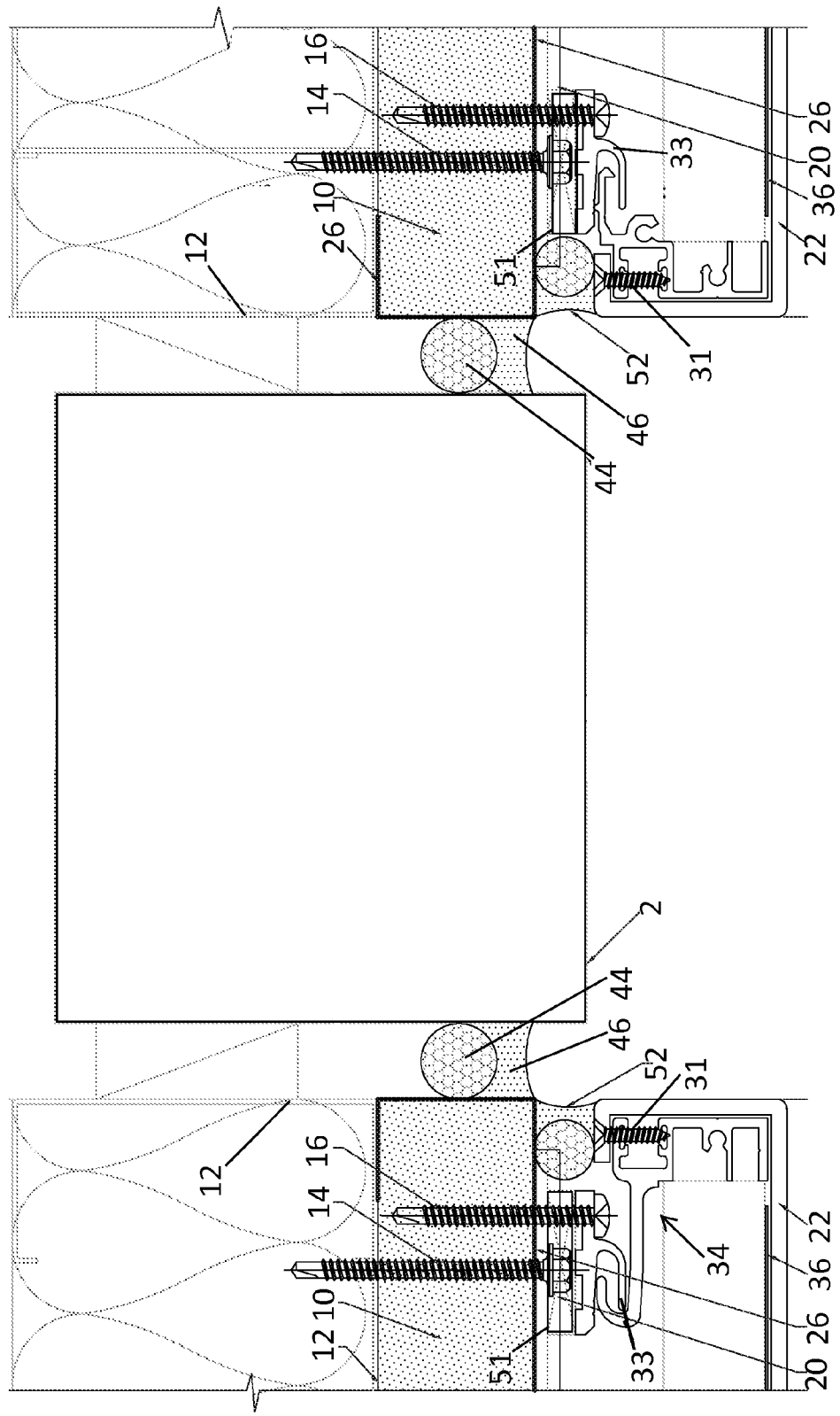
FIG. 2 illustrates a cross-sectional view of an installation of metal composite panels on metal studs with intervening window (or door).

Referring to FIG. 2, a schematic view of an installation of metal composite panels 22 on metal studs 12 with intervening window 2 is shown. The window is made of, for example, glass, plastic and/or aluminum components. The window may also be termed a storefront or curtain wall. In this, the window 2 is sealed against the insulation layer 10 by a gasket 44 and/or sealant 46. For brevity reasons, the physical mounting of the window 2 to the wall system 12 (e.g. metal studs 12) is not shown.

Referring to FIG. 3, an intermediate vertical member 29A/29B of the metal composite panel system is shown. Note that the optional rain-screen insert 24 is shown mounted within the intermediate vertical member 29A/29B.

Referring to FIG. 4, a stiffener member 37 of the metal composite panel system is shown. The stiffener member 37 is affixed to the impact plate 36 or directly to an inside surface of the composite aluminum panel 22 with an adhesive 38 such as a silicone adhesive (e.g., Dow 983 from the Dow Corning Company). The stiffener is preferably made from aluminum, though any suitable structural material is equally anticipated such as steel or iron. Panels that have the stiffener 37 installed have passed testing to ASTM E 330 (85-125 pounds per square foot) and have been shown to meet Florida Building Code deflection requirements.

Referring to FIG. 5, a vertical member 60 located at the edge of composite panel system of the metal composite panel system is shown.

When installed without shims 51, it is anticipated that, in some installations, the panels 22 system members 30/33/32A/32B/29A/60 are separated from the face of the insulation layer 10 by approximately ¼", which was not possible in prior systems that utilize horizontal and vertical girts.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A composite panel system for attaching to an external surface of a wall system, the composite panel system comprising:
- a plurality of continuous insulation panels attached to a wall system;
- a plurality of composite panels, each panel comprising a first and a second metal skin, the first metal skin bonded to a first side of a planar core and the second metal skin bonded to an opposing side of the planar core;
- a plurality of vertical girts mounted vertically and located between a header of the wall system and a base of the wall system, anchored by fasteners passing through one of the the vertical girts through one of the continuous insulation panels and into the wall system;
- composite panels of the plurality of composite panels are mounted between vertical girts of the vertical girts; and
- a plurality of horizontal members, each horizontal member mounted to the vertical girts by fasteners; a first edge of one of the composite panels is fastened to a first horizontal member of the plurality of horizontal members and a distal second edge of the one of the composite panels is fastened to an adjacent second horizontal member of the plurality of horizontal members.

2. The composite panel system of claim 1, wherein the planar core is polyethylene.

3. The composite panel system of claim 1, wherein the planar core is made of a fire retardant.

4. The composite panel system of claim 1, wherein the metal skins are made of aluminum.

5. The composite panel system of claim 4, wherein the aluminum is 0.020 inches thick.

6. The composite panel system of claim 1, further comprising impact plates held to the composite panels with an adhesive layer.

7. The composite panel system of claim 1, wherein the plurality of continuous insulation panels further comprise a sealing system that includes tape and silicone.

8. The composite panel system of claim 6, further comprising a stiffener affixed to each of the impact plates by an adhesive.

9. The composite panel system of claim 1, further comprising a stiffener affixed to the composite panels by an adhesive.

10. The composite panel system of claim 1, wherein the wall system comprises steel studs.

11. The composite panel system of claim 1, wherein the wall system comprises cement walls.

* * * * *